United States Patent [19]

Ide et al.

[11] Patent Number: 4,729,789

[45] Date of Patent: Mar. 8, 1988

[54] PROCESS OF MANUFACTURING AN EXTRUDER SCREW FOR INJECTION MOLDING MACHINES OR EXTRUSION MACHINES AND PRODUCT THEREOF

[75] Inventors: Tsuneyuki Ide; Kazunori Nakano; Masaru Inoue; Yoshikazu Kondo, all of Yamaguchi, Japan

[73] Assignee: Toyo Kohan Co., Ltd., Tokyo, Japan

[21] Appl. No.: 53,363

[22] Filed: May 21, 1987

[30] Foreign Application Priority Data

Dec. 26, 1986 [JP] Japan ............................... 61-308920

[51] Int. Cl.⁴ ............................................ C22C 29/14
[52] U.S. Cl. ........................................ 75/244; 419/8; 419/11; 419/12; 419/42; 419/60; 419/68
[58] Field of Search ................. 75/244; 419/8, 11, 12, 419/42, 60, 68

[56] References Cited

U.S. PATENT DOCUMENTS 2,652,520  9/1953  Studders ................................. 419/8
3,992,202 11/1976  Dulis et al. ............................ 419/49
4,595,556  6/1986  Umeha et al.
4,616,389 10/1986  Slee ....................................... 419/8

FOREIGN PATENT DOCUMENTS 55-6907   2/1980  Japan.
61-183430 8/1986  Japan.

*Primary Examiner*—Stephen J. Lechert, Jr.
*Attorney, Agent, or Firm*—Wenderoth, Lind & Ponack

[57] ABSTRACT

A process of making a composite of a sintered layer on a metal core member, such as an extruder screw having a sintered hard layer on a steel core, by charging a green compact sintering powder material into a space between an inner surface of a compressible mold and an outer surface of a mold core, sealing the compressible mold with the green compact material and the mold core therein, isostatic pressing the sealed compressible mold with the green compact material and the mold core therein, removing the mold core from the isostatically pressed green compact thus forming a cavity therein, inserting a metal core in the cavity in the isostatically pressed green compact with the metal core having a smaller transverse cross-section than the previously removed mold core and shrinking and bonding the isostatically pressed green compact onto the metal core by heating the isostatically pressed green compact and the metal core to a temperature at which the isostatically pressed green compact is sintered resulting in shrinkage thereof and bonding of the sintered material onto the metal core.

20 Claims, 4 Drawing Figures

FIG.3
FIG.4
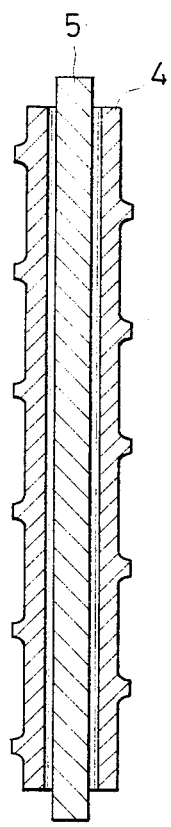
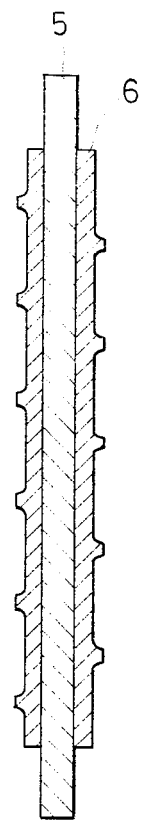

PROCESS OF MANUFACTURING AN EXTRUDER SCREW FOR INJECTION MOLDING MACHINES OR EXTRUSION MACHINES AND PRODUCT THEREOF

BACKGROUND OF THE INVENTION

1. Field of the Invention

The present invention relates to a process of manufacturing an extruder screw of the type used in a machine having a screw feed mechanism, such as in injection molding macines or extrusion machines.

2. Description of the Prior Art

At the present time there is great demand for an injection molding machine or extrusion machine which uses a screw feed mechanism. However, in recent years the types of resins to be treated have been increasing in large number and some of these resins produce corrosive gases such as fluorine gas associated with melting of the resins at the time of processing. Also, there is an increasing number of resins which contain abrasive solids, for example, resins incorporating glass fibers, carbon fibers or magnetic powders. Furthermore, these injection molding machines and extrusion machines are now being used in the processing of ceramic materials.

For the above reasons, the requirements of corrosion resistance and wear resistance for the material used as parts of the injection molding machine or the extrusion machine are becoming increasingly more severe. Of these parts, the extruder screw constitutes an important part of the screw feed mechanism since it not only transports raw resins but also performs melting and mixing thereof. Thus, the material used for the extruder screw requires a combination of sufficient strength, corrosion resistance and wear resistance. Materials which have been used for such an extruder screw include steels such as maraging steels or cold-worked tool steels, e.g. JIS type SKD-11.

The maraging steels exhibit a high strength, but do not necessarily have sufficient corrosion and wear resistance. For instance, if the processed resins include abrasive solids, such as glass fibers, the threaded part of the screw (the so-called flight) will wear faster and thus the life of the extruder screw will be shortened. Likewise, although the cold-worked tool steels may include tool steels with fine chromium carbides precipitated and disbursed in the material, these steels do not always have sufficient wear resistance against resins containing glass fibers or magnetic powders. In addition, the processing of ceramic materials cannot be achieved without even faster wear rates.

Various proposals have been suggested to eliminate the disadvantages of extruder screws made of steel, such as providing a spray coating of cobalt-based alloys or nickel-based alloys containing particles of high hardness, such as tungsten carbides, or providing a composite extruder screw and the like having a sintered alloy of these types of coatings affixed thereto (for example, such as the one disclosed in Japanese Patent Laid-Open NO. 183430/86). However, alloys containing particles of tungsten carbide have a disadvantage in that they tend to wear parts contacting these alloys (in the present instance, the internal wall of the cylinder), even if these parts are made of alloys which are wear resistant. In addition, since tungsten is a scarce resource and tungsten mines are not uniformly distributed throughout the world, such materials are more expensive and more difficult to obtain.

SUMMARY OF THE INVENTION

An object of the present invention is to provide an extruder screw which eliminates the above mentioned disadvantages with the conventional screws.

The present invention provides a process for manufacturing an extruder screw using a powder metallurgical technique for bonding an outer material to a substrate by sintering.

In the present invention, a composite material is formed by providing an extruder screw having an outer layer of a high wear resistant material over a relatively inexpensive metal core having sufficient toughness. The high wear resistant material is bonded to the metal core by sintering a green compact having a cavity therein which has a larger transverse cross-section than the metal core.

The process of the present invention is carried out by charging a green compact sintering material into a compressible mold having a mold core therein, sealing the compressible mold with the green compact material and the mold core therein, isostatic pressing the compressible mold with the green compact material and the mold core therein, removing the mold core from a cavity in the isostatically pressed green compact after the step of isostatic pressing of the sealed compressible mold, inserting a metal core in the cavity in the isostatically pressed green compact with the metal core having a smaller transverse cross-section than the mold core which was removed from the isostatically pressed green compact, and sintering the isostatically pressed green compact with the metal core therein to thereby shrink and bond the isostatically pressed green compact onto the metal core.

The sintered material comprises a hard phase and a matrix phase and more particularly, the sintered material can comprise 25–96 wt. % (23–96 vol. %), of a material selected from the group consisting of Fe-B, Fe-X-B and Fe-X-Y-B wherein X and Y are Cr, Mo, W, Ti, V, Nb, Ta, Hf, Zr, Ni, Cu, Co, Mn and mixtures thereof. Preferably, the sintered material includes 2–20 wt. % B, at least 10 wt. % Fe, 0.1–50 wt. % of Cr, Mo, W and mixtures thereof, 0.01–15 wt. % of Ti, V, Ta, Hf, Zr, Ni, Cu, Co, Mn and mixtures thereof, 3 wt. % or less of Al, 2.5 wt. % or less of O, and 0.01–1 wt. % C.

The compressible mold of the present invention is preferably synthetic rubber, such as silicone rubber.

The metal core is preferably a low cost steel and is sized 5–20% smaller in width than the width of the cavity in the isostatically pressed green compact and the sintering step is preferably performed with the isostatically pressed green compact oriented vertically.

BRIEF DESCRIPTION OF THE DRAWINGS

The present invention will be described with reference to the accompanying drawings in which:

FIG. 3 is a schematic sectional diagram illustrating the difference in size between a metal core and the internal cavity of the green compact shown in FIG. 3; and FIG. 4 is schematic sectional diagram illustrating the extruder screw produced by the process of the present invention.

DETAILED DESCRIPTION OF THE PREFERRED EMBODIMENTS

The present invention provides a new and useful process for manufacturing a composite of a metal substrate with a sintered material thereon, the sintered material being bonded to the substrate during a sintering step which shrinks the sintered material and bonds the sintered material to the substrate. More particularly, the invention provides a process for manufacturing an extruder screw for plasticization machines by using a powder metallurgical technique for bonding an outer layer to a core material during a sintering step. The composite material comprises a high wear resistant material as an outer layer of the extruder screw and the core of the extruder screw is made of a relatively inexpensive steel having sufficient toughness. The process of producing the composite extruder screw will be described as follows.

Figure 1:
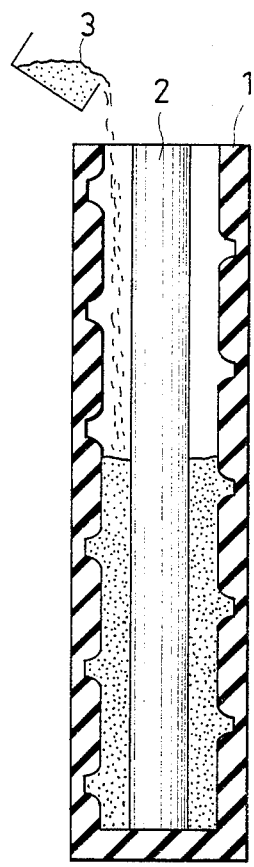
FIG. 1 is a schematic sectional diagram illustrating a step of charging the raw powder in the compressible mold in the course of the screw manufacturing process of the present invention.

FIG. 1 shows the step of charging a green compact sintering material 3 into a space formed between the inner surface of a compressible mold 1 and the outer surface of a mold core 2. The compressible mold 1 is made of a material which can be elastically deformed, for example synthetic rubber, and the inner surface of the mold is formed with at least one helically shaped recess therein extending along the length of the compressible mold 1. The helically shaped recess forms a "flight" on the outer surface of the extruder screw. After the green compact sintering material has been charged into the compressible mold, which as shown in FIG. 1 can be closed at a bottom end thereof, the compressible mold is sealed with the green compact material 3 and the mold core 2 therein. Subsequently, the compressible mold is pressed by an isostatic pressing method. Various methods can be used for the pressing step, but isostatic type pressing is most desirable in view of isotropic pressing characteristics and manufacturing costs. One example of a suitable isostatic pressing technique is the cold isostatic pressing (CIP) method. The material of the mold should exhibit sufficient elasticity since the green compact formed by the sintering powder material is compressed or shrunk to a smaller size in the CIP shaping process, and therefore, a mold material of rubber is preferable for this purpose. More preferably, a rubber which allows shaping into a female mold of the extruder screw may be used. In particular, a silicone rubber can be used which is made by mixing raw rubber in a liquid state with hardening additives, and such a material is most suitable for the mold of the present invention due to its property of turning into an elastic rubber with the aid of hardeners after being molded into an extruder screw shape. The mold core 2, on the other hand, should have sufficient rigidity to prevent deformation during the CIP process, and thus inexpensive steels may be used for this purpose. The mold core also has the effect of preventing the screw-like long green compact from being broken at the time of the CIP process. The powder size of the raw material should preferably be fine since the particle size has an effect on the surface property of a sintered compact as well as on the sintering property of the liquid phase, and preferably the particle size should be 50$\mu$ and smaller, more preferably 30$\mu$ and smaller, and still more preferably finer than 30$\mu$.

Figure 2:
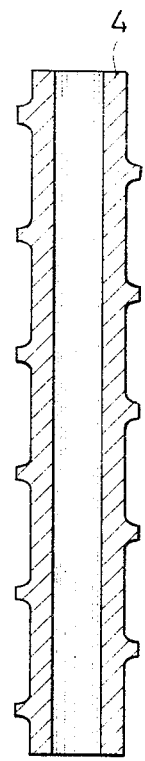
FIG. 2 is a schematic sectional diagram illustrating the screw-shaped green compact formed by isostatically pressing the charged compressible mold shown in FIG. 1.

After the isostatic pressing step, the mold core 2 is removed from a cavity in the isostatically pressed green compact 4, as shown in FIG. 2. Since the size of the green compact is reduced during the isostatic pressing step, it is important to take this effect into account when designing the compressible mold shape such that the shrinkage of the green compact during the isostatic pressing step and subsequently during the sintering step results in the desired dimensions for the final extruder screw.

The next step of the process is to insert a metal core 5 in the cavity of the isostatically pressed green compact 4, as shown in FIG. 3. According to the present invention, the metal core 5 should have a smaller transverse cross-section than that of the mold core 2, and thus there should be a gap between the outer surface of the metal core 5 and the inner surface formed by the cavity in the isostatically pressed green compact 4. The compact of the green compact 4 and metal core 5 is placed inside a sintering furnace with the longitudinal axis of the compact extending in a vertical or nearly vertical direction. Then, a sintering step is performed in vacuum or in a non-oxidizing atmosphere which results in shrinkage of the green compact 4 due to the formation of a liquid phase, and, concurrently the green compact is bonded onto the outer surface of the metal core 5.

The shrinkage of the green compact 4 during sintering may vary depending on the type of raw material, pressing pressure, or shape of the screw. However, in the manufacture of the extruder screw according to the present invention, dimensional accuracy after bonding by sintering is required and also the properties of the materials used in the composite must be maintained. Therefore, it is necessary to know the amount of shrinkage of the green compact 4 which will occur during the sintering step. Preferably, the external diameter of the metal core 5 should be in the range of from about 80 to 95% of the internal diameter of the cavity or central hole in the green compact 4. In other words, the width of the metal core 5 should be about 5 to 20% smaller than the width of the mold core 2. If the dimensions of the metal core 5 and the cavity in the green compact 4 are not maintained within this range, precision bonding by sintering cannot be accomplished and also the properties of the sintered material and the strength of the bonding interfaces will be degraded. If the external diameter of the metal core 5 is less than 80% of the internal diameter of the green compact 4, shrinkage of the green compact 4 will be excessive resulting in an over-sintered state of the sintered compact and a significent degrading of the properties thereof. In contrast, if the external diameter of the metal core 5 exceeds 95% of the internal diameter of the green compact, there will be insufficient shrinkage of the green compact, resulting in a non-sintered state of the green compact and difficulty in attaining the desired characteristics of the sintered compact. After the sintering step, the green compact 4 forms a layer of sintered material 6 which due to shrinkage and diffusion bonding thereof is bonded onto the outer surface of the metal core 5, as shown in FIG. 4. The interfaces between the sintered compact 6 and the metal core 5 provide a metallurgiclly bonded high strength joint. If desired, the extruder screw can be sized to a predetermined dimension by grinding. However, the sintered compact 6 obtained by the manufacturing process according to the present invention has an outer surface after sintering dimensioned within allowable tolerances. Therefore, one distinct advantage of the present inventive method includes, among others, a reduced need for machining which lowers cost of production.

An additional advantage of the present invention is that a green compact having a high length (L) to diameter (D) ratio can be achieved industrially without the fracture of the hard alloy material during the pressing and bonding by sintering steps. It is possible to manufacture an extruder screw having a length to diameter ratio (L/D) as high as 20. Thus, the inventive method provides for manufacturing of compacts having L/D ratios in excess of 5, or even in excess of 10.

The metal core material 5 to which the green compact is bonded includes low cost steels which are readily available and yet have superior mechanical properties for purposes of the present invention. The type of steels to be used is not necessarily limited, but they should permit bonding by sintering to a wear resistant sintered material used for the outer surface of the extruder screw of the present invention. Also, these steels should have sufficient mechanical properties required for an extruder screw, including suitable tensile strength, yield stress, 0.2% strain proof stress, hardness, etc. For example, the JIS standards for Irons and Steels indicate that steels acceptable for the present inventive method include carbon steels designated as SS, SC, SNC, SCr, SCM, SNCM and SUJ, low alloy steels containing C, Ni, Cr and Mo, tool steels designated as SK, SKH, SKS, SKD and SKT, and stainless steels such as SUS and SUH. Depending upon the operational conditions, even cast steels and cast irons may be acceptable. In addition, since heating to elevated temperatures for bonding by sintering tends to coarsen the microstructure of the core material 5 which tends to degrade the mechanical properties such as tensile strength, the use of ferritic or martensitic base steels which transform at a temperature between room temperature and the bonding temperature is desirable.

There are a variety of alloys which can be used for the wear resistant sintered material 6, including Ni-base self-soluble alloys containing B, Si and Cr, which form a liquid phase during sintering or Co-base stellite alloys, and more preferably ferrous boride hard alloys are proposed for use in the present invention. In addition, the sintered material can comprise a variety of materials manufactured by powder metallurgical techniques if such materials exhibit suitable wear resistance, corrosion resistance and mechanical properties. However, cemented carbides are not desirable due to the objectionable feature of causing undesirable wear of parts which come in contact with the cemented carbide material and also due to the fact that a high sintering temperature is required which causes coarsening of the microstructure of the metal core material which results is worsening of mechanical properties such as tensile strength.

The following description sets forth in detail some applications of ferrous boride hard alloys to the outer surface of the extruder screw, these alloys having been proposed by the inventors of the present invention and include alloys which have been disclosed in Japanese Patent Publications No. 27818/1979, No. 8904/1981, No. 15773/1981 and No. 57499/1985. These hard alloys (hereinafter referred to as "the hard alloy") have hardness, strength and wear resistance properties comparable to those of cemented carbides, and in addition to the wear resistance, the hard alloy also has corrosion resistance and elevated temperature oxidation resistance. Experiments have shown that the hard alloy is especially superior in wear resistance against resins or ceramics incorporating abrasive solids such as glass fibers or magnetic powders. The hard alloy comprises a ferrous boride hard phase and a binder or matrix phase of at least one metal selected from the group consisting of Fe, Cr, Mo, W, Ti, V, Nb, Ta, Hf, Zr, Ni, Cu, Co, Mn, and alloys thereof. The hard phase occupies 25 to 96 wt. % (23 to 96 vol. %) of the alloy, or more preferably from 35 to 96 wt. % (33 to 96 vol. %). The corresponding B content of the hard phase ranges from 2 to 20 wt. %, or more preferably from 3 to 15 wt. %. The Fe content is not less than 10 wt. %, the content of at least one metal selected from Cr, Mo and W is each in the range of from 0.1 to 50 wt. %, and the content of at least one metal selected from the group consisting of Ti, V, Ta, Hf, Zr, Ni, Cu, Co and Mn is in the range of from 0.01 to 15 wt. % for each element. Other unavoidable elements which can be contained in the hard alloy include not more than 3 wt. % of Al, not more than 2.5 wt. % of O and from 0.01 to 1 wt. % of C, of which Al and O are preferably not present but they may be contained within the above specified ranges provided they do not have adverse effects on strength and toughness. The hard alloy is a full-density sintered alloy because liquid phase sintering is performed, and the hardness thereof may range from Hv650 to 1870 depending on the amounts of the hard phase and the binder phase. The hard phase is composed of borides of B-Fe, B-X-Fe and B-X-Y-Fe wherein X and Y represent Cr, Mo, W, Ti, V, Nb, Ta, Hf, Zr, Ni, Cu, Co and Mn. These borides may comprise intermetallic compounds such as $Fe_2B$, $(Fe,Cr)_2B$, $Mo_2FeB_2$, $Mo_2(Fe,Cr)B_2$ and $(Mo,W)_2(Fe,Cr)B_2$. The binder phase may be an iron-base alloy comprising the abovementioned metals or alloys thereof, thus having a characteristic that, by controlling the type and quantity of additive metals such as Cr and Ni, the alloy can be changed into martensite or ferrite upon transformation of austenite thereto or the alloy can comprise a composite structure of martensite, ferrite and austenite. Consequently, the binder phase can be changed into a wide range of structures including a martensite-based structure like tool steels, ferritic and austenitic stainless steels or heat resistant steels, whereby the hard alloy is a wear resistant material having high hardness and strength as well as corrosion and heat resistance yet is light in weight compared to cemented carbide since its specific gravity ranges from 8 to 8.3, which is no greater than 60% of the specific gravity of cemented carbides.

The following description sets forth a manufacturing process for making the hard alloy. The hard alloy may be formed from an alloy powder of a boride such as FeB or $Fe_2B$ as the B source, produced by water or gas atomization, or alternatively the hard alloy can be made by blending a ferro-boron powder or boride powders incorporating Ni, Cr, W, Ti and Mo or a single B powder together with metal powders of Fe, Cr, Mo, W, Ti, V, Nb, Ta, Hf, Zr, Ni, Cu, Co and Mn or with alloy powders composed mainly of these elements into the required composition, subsequently wet pulverizing such a composite powder by means of an oscillating ball mill in an organic solvent, dry granulating the powder and pressing the powder into shapes followed by sintering of the shaped green compact in a vacuum or in a non-oxidizing atmosphere. The liquid phase sintering of the hard alloy is generally performed at a temperature ranging from 1100° to 1400° C. for a pedriod of time ranging from 5 to 90 minutes. When the sintering temperature is lower than 1100° C., sintering is not sufficiently developed due to insufficient formation of a liquid phase resulting in a non-sintered state. In contrast, sintering temperatures above 1400° C. cause oversintering which results in coarsening of the hard phase and excessive dimensional changes. Likewise, when the sintering period is less than 5 minutes, densification does not progress to a sufficient extent and, in contrast, when the sintering period exceeds 90 minutes, there is no improvement in strength in spite of the prolonged period of sintering. However, in some cases a decrease in strength may occur due to coarsening of the hard phase. During the sintering step, eutectic liquid is formed having good wetability with the steel core and with the ferrous boride and Fe, Ni or Cr thereby facilitating bonding of the hard alloy and the steel core.

An experiement was conducted to compare the corrosion and wear resistance of the hard alloy applied as the outer layer of the extruder screw according to the present invention versus that of an SKD-11 steel. The SKD-11 steel is one of the types currently applied most commonly in the severest conditions of injection molding of resins incorporating abrasive solids such as glass fibers or magnetic powders. In many cases, the materials applied by manufacturers are more or less variations of the SKD-11 steel to improve the toughness, hardness or other properties thereof. For this reason, and SKD-11 steel was selected for comparison.

First, a corrosion test was conducted in the following manner. Test specimens having dimensions of 10×20×5 mm were dipped in a polyamid resin at resin temperatures ranging from 276° to 278° C. for an emerging time of 20 hours. Then, the amount of weight loss due to corrosion (mdd:mg/dm$^2$/day) was determined. The test results of the hard alloy used in the embodiment of the present invention showed a weight loss of 50 mdd, while that of the SKD-11 steel was 1500 mdd. Next, the wear resistance was evaluated by using an Ohgoshi-type wear tester under test conditions of a sliding velocity of 0.51 m/sec, a sliding distance of 200 m, a final load of 18.9 kg and a wear block made of JIS SUS 440C steel. As a result of this test, the wear volumes of the hard alloy used in the embodiment of the present invention and of the SUS 440 steel were 0.11 mm$^3$ and 0.54 mm$^3$, respectively, with the sum of the wear volumes being 0.65 mm$^3$. In contrast, when the SKD-11 steel and the SUS 440 steel were combined, the respective wear volumes were 4.56 mm$^3$ and 5.33 mm$^3$, with the sum of the wear volumes being 9.89 mm$^3$. From these results it can be seen that the hard alloy of the present invention exhibits a corrosion resistance to resin which is 30 times greater than that of the conventional SKD-11 alloy. Also, in view of the Ohgoshi-type wear test, the hard alloy exhibits a wear resistance approximately 40 times greater than that of the conventional SKD-11 alloy and the combined wear resistance is approximately 15 times better than the combined wear resistance of the conventional SKD-11 alloy with the SUS 440 wear block. Thus, it can be seen that the hard alloy of the present invention is not only superior in wear resistance but also reduces the wear of contacting parts as well.

An example of the process according to the present invention for making an extruder screw will be explained as follows.

EXAMPLE 1

A blended powder comprising 46 wt. % of a gas atomized alloy powder composed of 9.0 wt. % of B, 12.5 wt. % of Cr, 0.03 wt. % of Al, 0.33 wt. % of Si, 0.21 wt. % of C, balance of Fe, 37 wt. % of Mo powder, 5 wt. % of W powder, 3 wt. % of Cr powder, 3 wt. % of Ni powder, and the balance of Fe powder, was comminuted by wet ball milling for a period of 28 hours in a ball mill made of iron and then the ball milled mixture was made into powder by dry granulating. Then, as illustrated in FIG. 1, the mold core 2 was inserted into a compressible mold 1, which is made of a silicone rubber having an internal surface shaped like an extruder screw, and the above described powder as the raw material was charged in the gap between the mold core 2 and the internal surface of the compressible mold 1. Next, the silicone rubber mold, together with the mold core and raw powder, was sealed and the raw powder was pressed into the shape of an extruder screw by means of cold isostatic pressing. The dimensions of the green compact formed at this time were an outer diameter of 37 mm (flight outer diameter), a screw pitch of 34.5 mm, an inner diameter of 25 mm and a length of 710 mm. Subsequently, the green compact was placed in a vacuum sintering furnace with the longitudinal axis thereof extending in a vertical direction, as illustrated in FIG. 3 and a steel core of JIS type SNCM 439 for use in bonding to the sintered material was inserted into the center hole of the green compact. The steel core was machined such that its outer diameter was 23 mm and its length was 800 mm. Then the green compact with the steel core therein was heated to 1250° C. for a period of 20 minutes for simultaneous sintering of the powder material and bonding thereof to the steel core. The composition of the hard alloy was measured by chemical analysis and was determined to consist of 4.0 wt. % of B, 8.3 wt. % of Cr, 36 wt. % of Mo, 4.8 wt. % of W, 0.10 wt. % of C, 0.01 wt. % of Al, 0.13 wt. % of Si and 0.01 wt. % of O. The dimensional shrinkage of the green compact during the bonding of the sintering step was 8% in inner diameter of the green compact, 9% in outer diameter of the green compact and 7.5% in length of the green compact. The dimensions of the composite extruder screw after finishing by grinding the external surface thereof was 32 mm in outer diameter (flight diameter), 25 mm in root diameter, 32 mm in screw pitch, 3.5 mm in screw width (flight width), and 650 mm in screw length.

The extruder screw produced by the method of the present invention has remarkably improved properties of corrosion and wear resistance compared to an extruder screw made of an SKD-11 steel. Thus, the extruder screw of the present invention can be used for injection molding machines or extrusion machines whereby injection molding of even ceramic products is made possible.

While the invention has been described with reference to the foregoing embodiments, it should be understood that various changes and modifications may be made without departing from the spirit and scope of the invention.

We claim:

1. A process of making a composite of a sintered layer on a metal core member comprising:

charging a green compact sintering powder material into a space between an inner surface of a compressible mold and an outer surface of a mold core disposed in said compressible mold;

sealing said compressible mold with said green compact material and said mold core therein;

isostatic pressing said sealed compressible mold with said green compact material and said mold core therein;

removing said mold core from said isostatically pressed green compact thus forming a cavity therein after said step of isostatic pressing of said sealed compressible mold;

inserting a metal core in said cavity in said isostatically pressed green compact, said metal core having a smaller transverse cross-section than said previously removed mold core;

shrinking and bonding said isostatically pressed green compact onto said metal core by heating said isostatically pressed green compact and said metal core to a temperature at which said isostatically pressed green compact is sintered resulting in shrinkage thereof and bonding of said sintered material onto said metal core.

2. The process of claim 1, wherein said sintered material comprises a hard phase and a matrix phase.

3. The process of claim 1, wherein said sintered material comprises about 25-96 wt. % (23-96 vol. %) of a material selected from the group consisting of Fe-B, Fe-X-B and Fe-X-Y-B, wherein X and Y are Cr, Mo, W, Ti, V, Nb, Ta, Hf, Zr, Ni, Cu, Co, Mn and mixtures thereof.

4. The process of claim 3, wherein said sintered material includes 2-20 wt. % B.

5. The process of claim 3, wherein said sintered material includes at least 10 wt. % Fe.

6. The process of claim 3, wherein said sintered material includes 0.1-50 wt. % of a material selected from the group consisting of Cr, Mo, W and mixtures thereof.

7. The process of claim 3, wherein said sintered material includes 0.01-15 wt. % of a material selected from the group consisting of Ti, V, Ta, Hf, Zr, Ni, Cu, Co, Mn and mixtures thereof.

8. The process of claim 3, wherein said sintered material includes 3 wt. % or less of Al.

9. The process of claim 3, wherein said sintered material contains 2.5 wt. % or les of O.

10. The process of claim 3, wherein said sintered material contains 0.01-1 wt. % C.

11. The process of claim 1, wherein said compressible mold is of synthetic rubber.

12. The process of claim 11, wherein said synthetic rubber is silicone rubber.

13. The process of claim 1, wherein the longitudinal axis of said isostatically pressed green compact is oriented to extend in a substantially vertical direction throughout said sintering step.

14. The process of claim 1, wherein said isostatic pressing step is a cold isostatic pressing step.

15. The process of claim 1, wherein said green compact has a length to width ratio of at least 5.

16. The process of claim 1, wherein said sintering step is performed in a vacuum.

17. The process of claim 1, wherein said sintering step is performed in a non-oxidizing atmosphere.

18. The process of claim 1, wherein said compressible mold is shaped such that the internal surface thereof is cylindrical with at least one helically shaped recess therein extending along the length of said compressible mold, said charging effecting filling of a space formed between an outer surface of said mold core and the inner surface of said compressible mold whereby said green compact forms the shape of an extruder screw for an injection molding machine after said charging step, said cavity being cylindrical and said metal core being steel and having a diameter of 80-95% of the diameter of said cylindrical cavity.

19. The process of claim 1, wherein said metal core is dimensioned to be about 5-20% smaller in the width than the width of said cavity.

20. The product produced by the process of claim 18.

* * * * *